US008274556B2

(12) United States Patent
Cha et al.

(10) Patent No.: US 8,274,556 B2
(45) Date of Patent: Sep. 25, 2012

(54) BACKLIGHT UNIT AND 2D/3D SWITCHABLE IMAGE DISPLAY DEVICE EMPLOYING THE BACKLIGHT UNIT

(75) Inventors: Kyung-hoon Cha, Yongin-si (KR); Sergey Chestak, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1249 days.

(21) Appl. No.: 12/018,434

(22) Filed: Jan. 23, 2008

(65) Prior Publication Data

US 2008/0316596 A1    Dec. 25, 2008

(30) Foreign Application Priority Data

Jun. 25, 2007 (KR) .................. 10-2007-0062487

(51) Int. Cl.
*H04N 13/04* (2006.01)
(52) U.S. Cl. ........... 348/54; 359/463; 359/619; 345/102
(58) Field of Classification Search .................... 348/54; 359/619; 345/102
See application file for complete search history.

(56) References Cited

U.S. PATENT DOCUMENTS

| 5,833,507 A | * | 11/1998 | Woodgate et al. ............. 445/24 |
| 2004/0257495 A1 | | 12/2004 | Hattori et al. |
| 2005/0046951 A1 | * | 3/2005 | Sugihara et al. ............. 359/619 |
| 2006/0192746 A1 | * | 8/2006 | Ioki et al. ..................... 345/102 |

FOREIGN PATENT DOCUMENTS

| CN | 1573435 A | 2/2005 |
| JP | 2004-020684 A | 1/2004 |

OTHER PUBLICATIONS

Office Action issued by the Intellectual Property Office of the P. R. of China on Dec. 23, 2010 in the corresponding Chinese Patent Application No. 200810082971.X.

* cited by examiner

*Primary Examiner* — Yves Dalencourt
(74) *Attorney, Agent, or Firm* — Sughrue Mion, PLLC

(57) ABSTRACT

A 2D/3D switchable image display device is provided. The device includes an image panel, a backlight unit arranged at the rear side of the image panel, and a lenticular lens sheet arranged between the image panel and the backlight unit. The backlight unit includes a plurality of segment light sources for a left eye vision range which emit a light for a left eye vision range, and a plurality of segment light sources for a right eye vision range which emit a light for a right eye vision range. The segment light sources for the left eye vision range and the segment light sources for the right eye vision range are alternately arranged to form a surface light source. The lenticular lens sheet includes a plurality of semi-cylindrical lenses arranged in a direction perpendicular to a viewing direction of both eyes of a viewer.

18 Claims, 19 Drawing Sheets

BACKLIGHT UNIT AND 2D/3D SWITCHABLE IMAGE DISPLAY DEVICE EMPLOYING THE BACKLIGHT UNIT

CROSS-REFERENCE TO RELATED PATENT APPLICATIONS

This application claims priority from Korean Patent Application No. 10-2007-0062487, filed on Jun. 25, 2007 in the Korean Intellectual Property Office, the disclosure of which is incorporated herein in its entirety by reference.

BACKGROUND OF THE INVENTION

1. Field of the Invention

Apparatuses consistent with the present invention relate to a backlight unit and a 2D/3D switchable liquid crystal display (LCD) employing the backlight unit, and more particularly, to a backlight unit having a simple structure of providing light for a left eye vision range and light for a right eye vision range to a lenticular lens sheet, and a 2D/3D switchable LCD employing the backlight unit.

2. Description of the Related Art

As technology develops, an image display device capable of displaying a more real image is needed. Accordingly, a high resolution image display device having an increased number of pixels for displaying an image has been developed, and also a three-dimensional (3D) image display device capable of displaying an image in three dimensions is under development. Thus, the 3D image display device can be applied to not only televisions (TVs), but also to various applications including medical images, games, advertisements, education, and military affairs. Thus, a greater 3D effect and experience can be obtained.

A 3D image is generated by the principle of stereo vision of both eyes. That is, since both eyes are separated about 65 mm from each other, binocular parallax occurs as the most important factor in a 3D sense. If an actual image viewed by the eyes can be input to the eyes, the 3D sense can be easily observed. For example, the 3D sense can be observed by photographing an object using two cameras having the same characteristics and separated by the distance between both eyes, and displaying a left image photographed by the left camera and a right image photographed by the right camera on the left and right eyes, respectively.

A 3D image display device that is based on binocular parallax may be an autostereoscopic type or a stereoscopic type. The autostereoscopic type that separates the left and right images and obtains a 3D image without using glasses includes a parallax barrier type, a lenticular type, an integral imaging type, and a holography type. The stereoscopic type that uses glasses includes a polarized glasses type and a shutter glasses type.

Among the 3D image display devices, as the technology for an image panel, such as an LCD, for displaying an image develops, the non-glasses type is actively being developed. FIG. 1 illustrates an example of a non-glasses type 3D image display device 1. Referring to FIG. 1, the non-glasses type 3D image display device 1 includes a backlight unit 3, an optical switch 5, a lenticular lens sheet 7, and a liquid crystal (LC) panel 9. The lenticular lens sheet 7 is an optical member in which a plurality of semi-cylindrical lenses 7a are arranged parallel to one another and extend lengthwise, that is, along a direction y in FIG. 1, in a direction perpendicular to a viewing direction of both eyes of a viewer.

The optical switch 5 includes a cell 5a for a left eye vision range and a cell 5b for a right eye vision range. The cells 5a and 5b are formed in alternating strips, and each set of cells 5a and 5b corresponds to one of the semi-cylindrical lenses 7a. The cells 5a and 5b are alternately switched between a transparent state and an opaque state, and the cells 5a and 5b are synchronized by an image signal for a left eye vision range and an image signal for a right eye vision range provided to the LC panel 9. A light for a left eye vision range and a light for a right eye vision range can alternately be transmitted toward the lenticular lens sheet 7, which allows the incident light for a left eye vision range and the incident light for a right eye vision range to proceed toward a left eye vision range $O_L$ and a right eye vision range $O_R$ of a viewer, respectively. The LC panel 9 alternately displays an image for a left eye vision range and an image for a right eye vision range. Thus, the non-glasses type 3D image display device 1 can enable the viewer to watch a 3D image by alternately providing the light for a left eye vision range and the light for a right eye vision range in synchronism with the image for a left eye vision range and the image for a right eye vision range displayed on the LC panel 9.

However, according to the non-glasses type 3D image display device 1, since the optical switch 5 that is interposed between the backlight unit 3 and the lenticular lens sheet 7 is needed, an assembly process is complicated, and a manufacturing cost of the non-glasses type 3D image display device 1 is increased. Also, a polarized switch is used as the optical switch 5, which further degrades the light use efficiency.

Since the non-glasses type 3D image display device 1 uses all pixels of the LC panel 9 to display the image for a left eye vision range and the image for a right eye vision range, the resolution of the image for a left eye vision range and the image for a right eye vision range is that of the LC panel 9. However, since the non-glasses type 3D image display device 1 needs one frame of the image for a left eye vision range and one frame of the image for a right eye vision range to display one frame of a 3D image, a decrease in a frame rate might occur. Since the image for a left eye vision range and the image for a right eye vision range cannot be instantly switched due to the limit in the response speed in the LC panel 9, when the frame rate decreases, a problem of crosstalk, in which the image for a left eye vision range and the image for a right eye vision range are mixed, becomes severe.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a backlight unit which has an improved structure so that its number of optical parts is decreased, the manufacturing process is simplified, the manufacturing cost is reduced, and a light use efficiency is improved. Exemplary embodiments of the present invention also provide a 2D/3D switchable LCD employing the backlight unit.

According to an aspect of the present invention, a backlight unit employed in a 2D/3D switchable image display device including an image panel and a lenticular lens sheet that is arranged at the rear surface of the image panel and splits light into left and right eye vision ranges, and provides light to the lenticular lens sheet, includes a plurality of segment light sources for a left eye vision range which emits a light for a left eye vision range and a plurality of segment light sources for a right eye vision range which emits a light for a right eye vision range The segment light sources for the left eye vision range and the segment light sources for the right eye vision range are alternately arranged to form a surface light source.

Each of the segment light sources for the left eye vision range includes a light guide segment for the left eye vision range having a light exit surface with a stripe shape, and a point light source for the left eye vision range which provides light to the light guide segment for the left eye vision range. Each of the segment light sources for the right eye vision range includes a light guide segment for the right eye vision range having a light exit surface with a stripe shape, and a point light source for the right eye vision range which provides light to the light guide segment for the right eye vision range. The light guide segment for the left eye vision range and the light guide segment for the right eye vision range are alternately arranged to form a light guide panel.

Each of the segment light sources for the left eye vision range includes an optical sheet for the left eye vision range and a light source for the left eye vision range arranged at the rear surface of the optical sheet for the left eye vision range. Each of the segment light sources for the right eye vision range includes an optical sheet for the right eye vision range and a light source for the right eye vision range arranged at the rear surface of the optical sheet for the right eye vision range.

According to another aspect of the present invention, a 2D/3D switchable image display device includes an image panel, a backlight unit arranged at the rear side of the image panel, and a lenticular lens sheet having a plurality of semi-cylindrical lenses extending lengthwise in a vertical direction, arranged between the image panel and the backlight unit, and allowing the light for a left eye vision range and the light for a right eye vision range to respectively proceed toward the left eye vision range and the right eye vision range. The backlight unit includes a plurality of segment light sources for the left eye vision range which emit a light for the left eye vision range, and a plurality of segment light sources for the right eye vision range which emit a light for the right eye vision range. The segment light sources for the left eye vision range and the segment light sources for the right eye vision range are alternately arranged to form a surface light source.

The image panel scans a vertical line of an image in a horizontal direction which is parallel to a segment connecting two eyes of a viewer.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
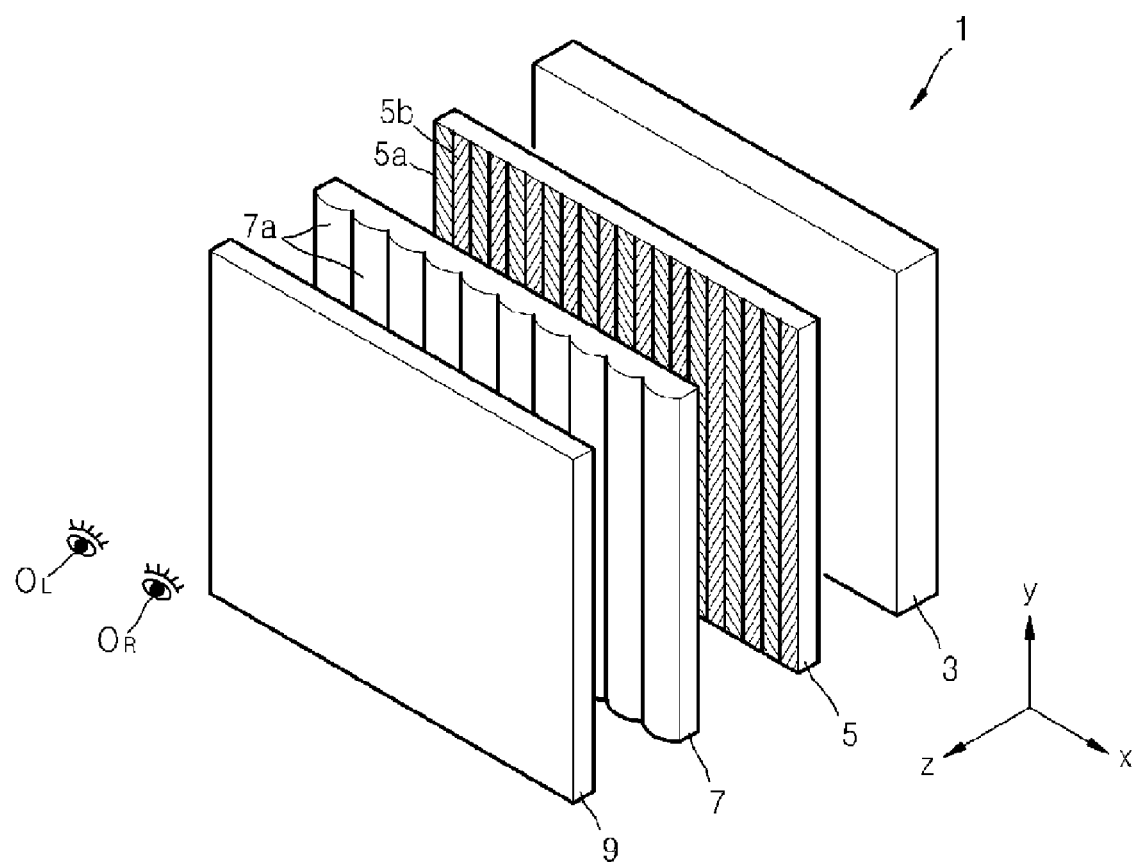
FIG. 1 illustrates an optical configuration of a related art 2D/3D switchable image display device.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements. The size of each of the constituent elements on the drawings may be exaggerated for the clarity and convenience of the explanation.

Figure 2:
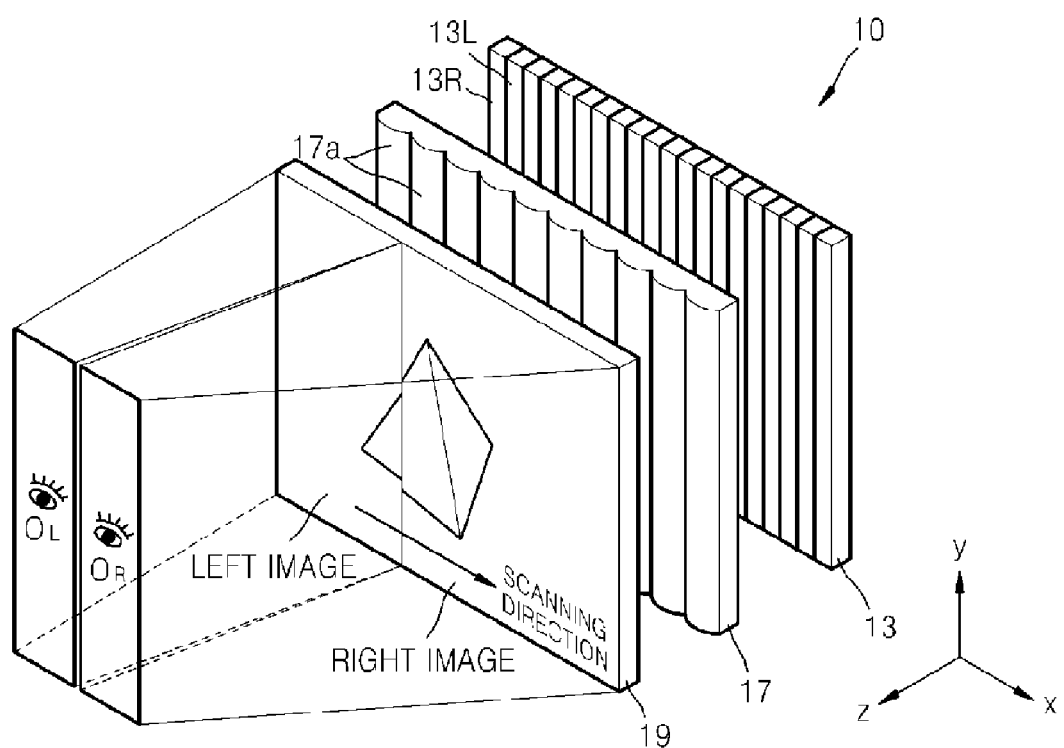
FIG. 2 illustrates an optical configuration of a 2D/3D switchable image display device according to an exemplary embodiment of the present invention.
Figure 3:
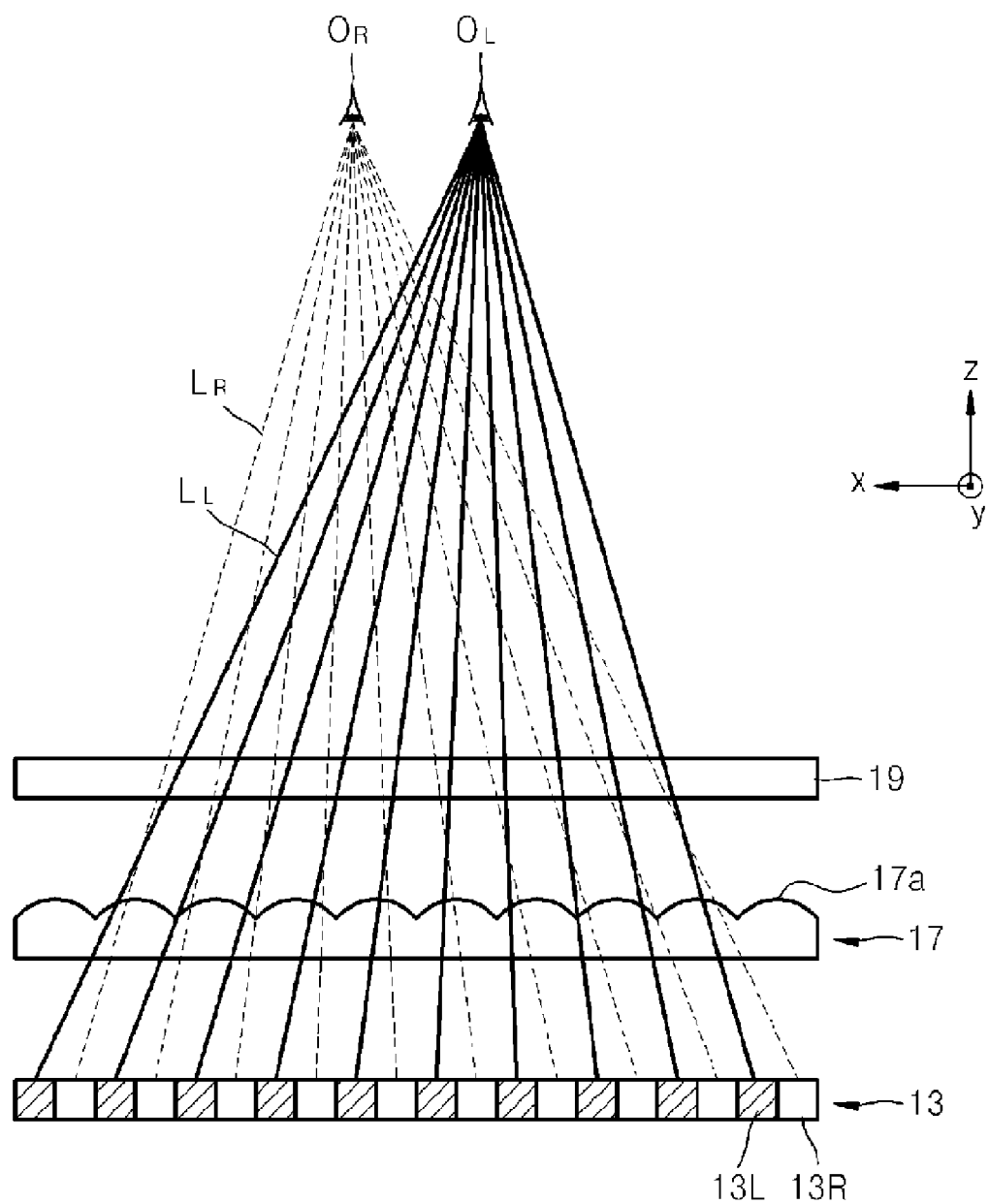
FIG. 3 is a cross-sectional view of the 2D/3D switchable image display device of FIG. 2 viewed from above.
Figure 4:
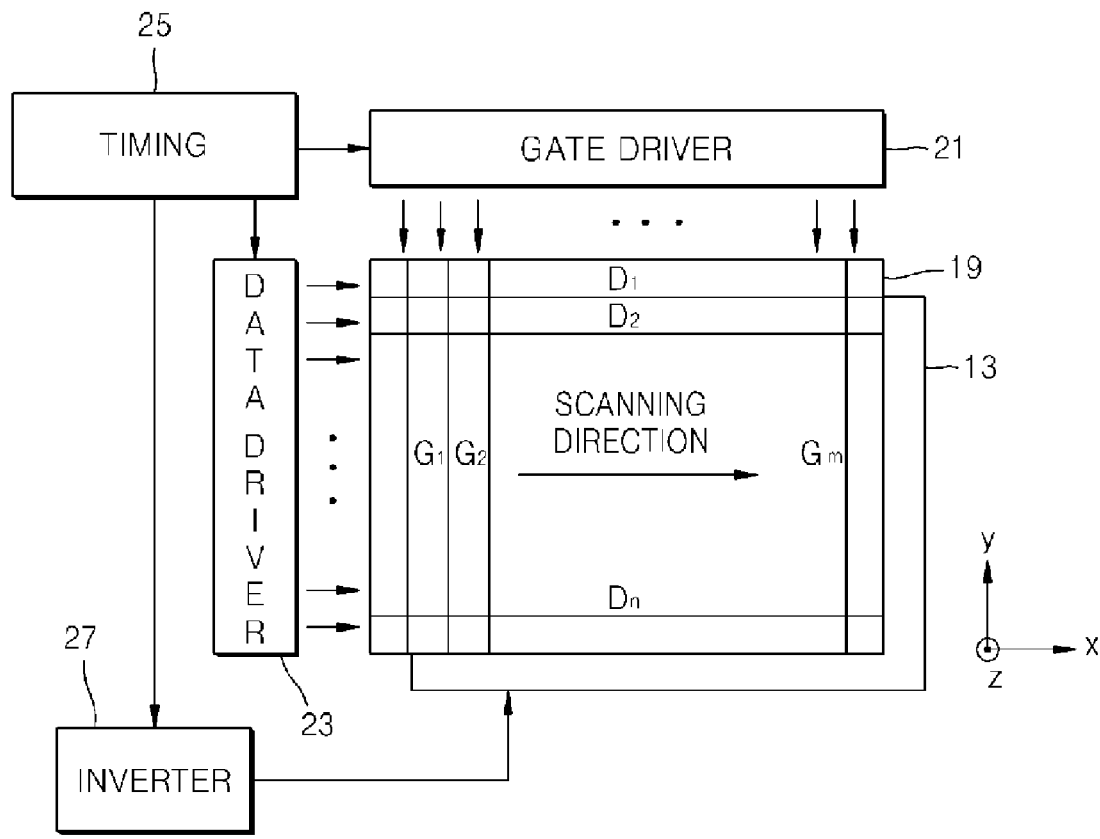
FIG. 4 illustrates the structure for inputting image data to an image panel employed in the 2D/3D switchable image display device of FIG. 2.

FIG. 2 illustrates an optical configuration of a 2D/3D switchable image display device 10 according to an exemplary embodiment of the present invention. FIG. 3 is a cross-sectional view of the 2D/3D switchable image display device 10 of FIG. 2 viewed from above. FIG. 4 illustrates the structure for inputting image data to an image panel 19 employed in the 2D/3D switchable image display device 10 of FIG. 2.

Referring to FIGS. 2 and 3, the 2D/3D switchable image display device 10 according to the present exemplary embodiment includes a backlight unit 13 which provides light, a lenticular lens sheet 17 which divides the light output from the backlight unit 13 to left and right eye vision ranges $O_L$ and $O_R$, and the image panel 19 which displays a 2D image or a 3D image.

The image panel 19 alternately displays an image for a left eye vision range and an image for a right eye vision range in a 3D mode, and displays a related art 2D image in a 2D mode. An LC panel can be used as the image panel 19. In the present exemplary embodiment, the image panel 19 scans a vertical line of a displayed image in a direction x that is a horizontal direction. As described later, this is performed to sequentially drive the backlight unit 13 in synchronism with the scanning of an image displayed on the image panel 19.

Referring to FIG. 4, the image panel 19 includes m×n pixels arranged in a matrix format. The m gate lines $G_1$, $G_2$, ..., $G_m$ and the n data lines $D_1, D_2, ..., D_n$ are arranged to cross each other. A thin film transistor (TFT) is formed at a cross point of the m gate lines $G_1, G_2, ..., G_m$ and the n data lines $D_1, D_2, ..., D_n$, thereby forming a pixel.

The image panel 19 is driven by a gate driver 21 which provides a scan signal and a data driver 23 which provides a data signal. The gate driver 21 and the data driver 23 are controlled by a timing controller 25 that controls the data driver 23 using a horizontal sync signal, and controls the gate driver 21 using a vertical sync signal. In response to the scan signal provided by the gate driver 21, the TFT formed at each pixel performs a switch operation based on the data signal provided by the data driver 23. In response to the vertical sync signal of the timing controller 25, the gate driver 21 sequentially provides a scan pulse to the m gate lines $G_1, G_2, ..., G_m$ to select the vertical line of the image panel 19 to which the data signal is provided. In response to the horizontal sync signal of the timing controller 25, the data driver 23 provides an image signal to the n data lines $D_1, D_2, ..., D_n$ to input a displayed image to the image panel 19 in units of vertical lines. The vertical line is scanned in the horizontal direction based on the scan signal of the gate driver 21 to display a 2D image. The backlight unit 13 is driven by an inverter 27 that is controlled by the timing controller 25.

Figure 5:
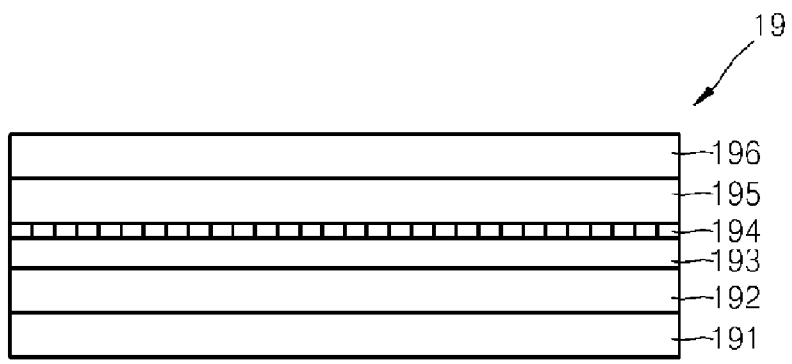
FIG. 5 is a cross-sectional view of an image panel employed in the 2D/3D switchable image display device of FIG. 2.

The image panel 19 according to the present exemplary embodiment is an LC panel having a color filter 194, as shown in FIG. 5. Referring to FIG. 5, the image panel 19 includes a first substrate 192, a second substrate 195, and a liquid crystal layer 193 sealed between the first and second substrates 192 and 195. First and second polarized panels 191 and 196 are attached to the bottom and top surfaces of the first and second substrates 192 and 195, respectively. The color filter 194 is provided between the bottom surface of the second substrate 195 and the top surface of the liquid crystal layer 193.

Figure 6:
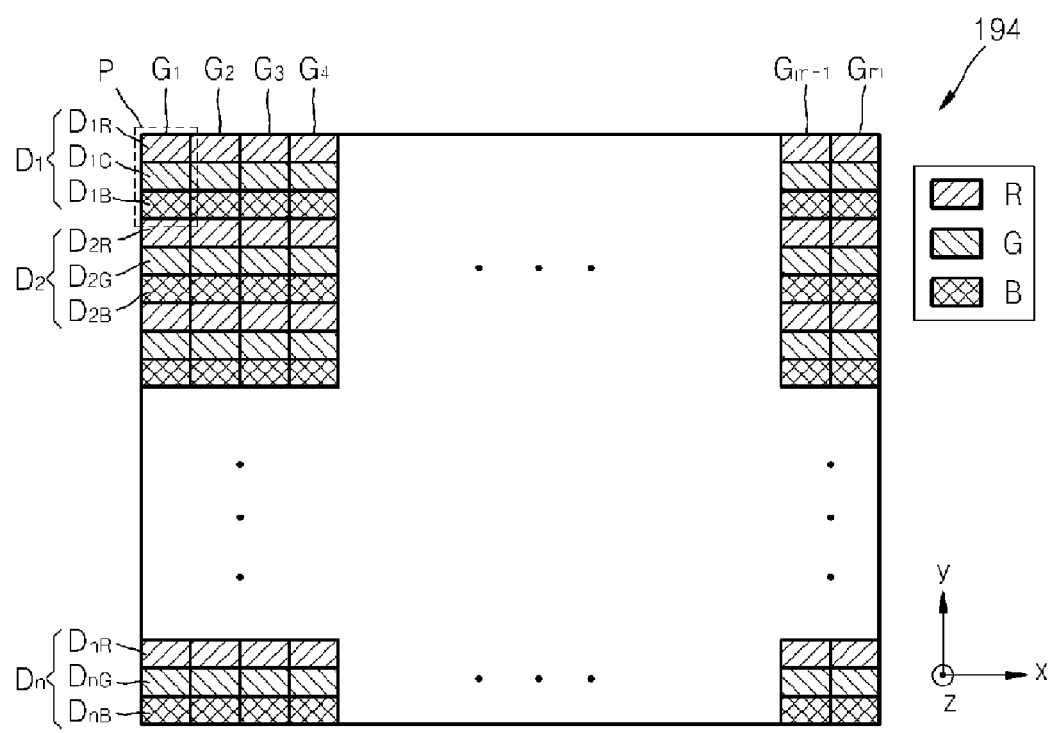
FIG. 6 illustrates the structure of a color filter of the image panel of FIG. 5.

In the color filter 194, as shown in FIG. 6, a red filter, a green filter, and a blue filter are repeatedly arranged in rows of strips extending lengthwise in the horizontal direction (the x direction). The image panel 19 has m×n pixels P, and each pixel P is formed of a red pixel, a green pixel, and a blue pixel. Each of the n data lines $D_1, D_2, ..., D_n$ includes a red data line $D_{nB}$, a green data line $D_{nG}$, and a blue data line $D_{nB}$. Cross points of each of the red data lines $D_{1R}, D_{2R}, ..., D_{nR}$, the green data lines $D_{1G}, D_{2G}, ..., D_{nG}$, and the blue data lines $D_{1B}, D_{2B}, ..., D_{nB}$ and the m gate lines $G_1, G_2, ..., G_m$ form a red pixel, a green pixel, and a blue pixel. The row in a stripe shape of the red filter corresponds to the red data lines $D_{1R}, D_{2R}, ..., D_{nR}$. The row in a stripe shape of the green filter corresponds to the green data lines $D_{1G}, D_{2G}, ..., D_{nG}$. The row in a stripe shape of the blue filter corresponds to the blue data lines $D_{1B}, D_{2B}, ..., D_{nB}$.

Referring back to FIGS. 2 and 3, the lenticular lens sheet 17, having a plurality of semi-cylindrical lenses 17*a* extending lengthwise in the direction perpendicular to the viewing direction of both eyes of a viewer (the y direction), is arranged between the image panel 19 and the backlight unit 13. Thus, the light $L_L$ for a left eye vision range proceeds toward a left eye vision range $O_L$, and the light $L_R$ for a right eye vision range proceeds toward a right eye vision range $O_R$. By arranging the lenticular lens sheet 17 that separates the eye vision ranges at the rear surface of the image panel 19, all pixels of the image panel 19 can be used for displaying each of the left and right eye vision ranges. Thus, compared to a 3D image display device having the lenticular lens sheet in front of the image panel, a higher resolution image can be achieved. Since the optical design, such as the arrangement interval or refractive power of the semi-cylindrical lenses 17*a*, can be appropriately designed by one skilled in the art in the field to which the present invention pertains by considering the viewing distance of a viewer and the distance between the backlight unit 13 and the image panel 19, a detailed description thereof will be omitted herein.

The backlight unit 13 forms a surface light source by including a plurality of segment light sources 13L for a left eye vision range and a plurality of segment light sources 13R for a right eye vision range that are alternately arranged. The segment light sources 13L for a left eye vision range and the segment light sources 13R for a right eye vision range are arranged in pairs, such that at least one pair corresponds to one of the semi-cylindrical lenses 17*a* of the lenticular lens sheet 17. For example, as shown in FIG. 3, any neighboring pair of the segment light sources 13L for a left eye vision range and the segment light sources 13R for a right eye vision range can be arranged to face the semi-cylindrical lenses 17*a* in a one-to-one manner. The segment light sources 13L for a left eye vision range provide the light $L_L$ for a left eye vision range to the lenticular lens sheet 17, and the segment light sources 13R for a right eye vision range provide the light $L_R$ for a right eye vision range to the lenticular lens sheet 17.

Figure 7:
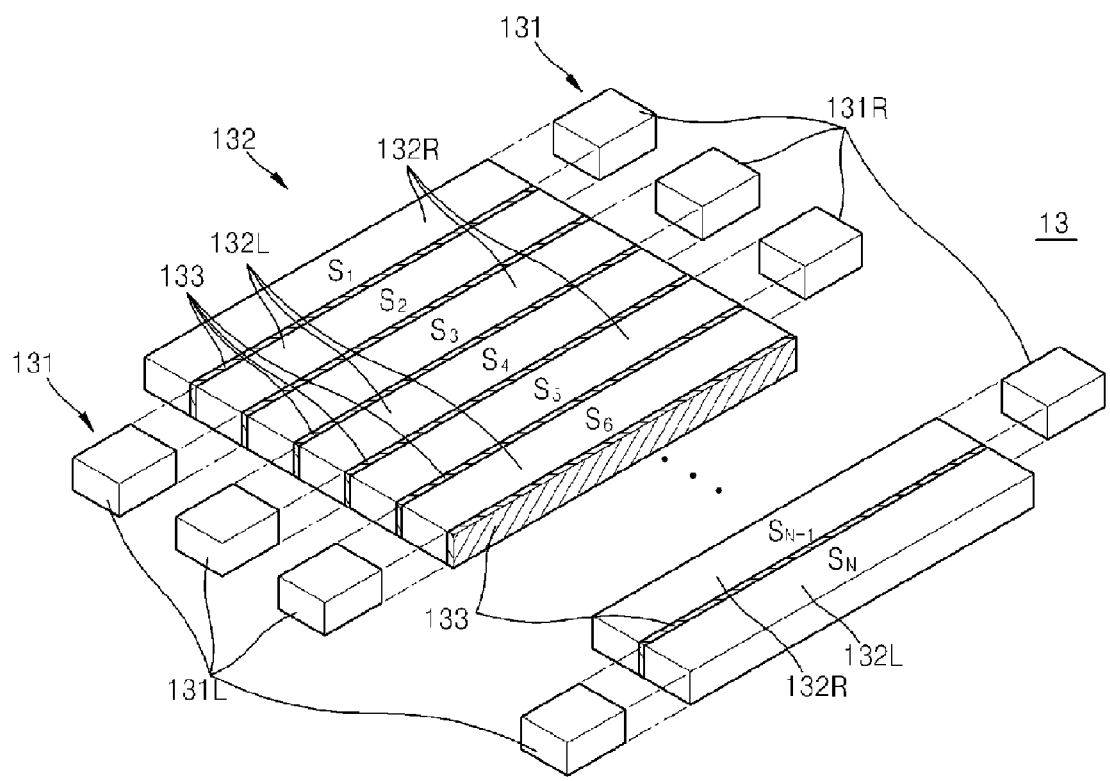
FIGS. 7 and 8 are an exploded perspective view and a plan view, respectively, of a backlight unit employed in the 2D/3D switchable image display device of FIG. 2.
Figure 8:
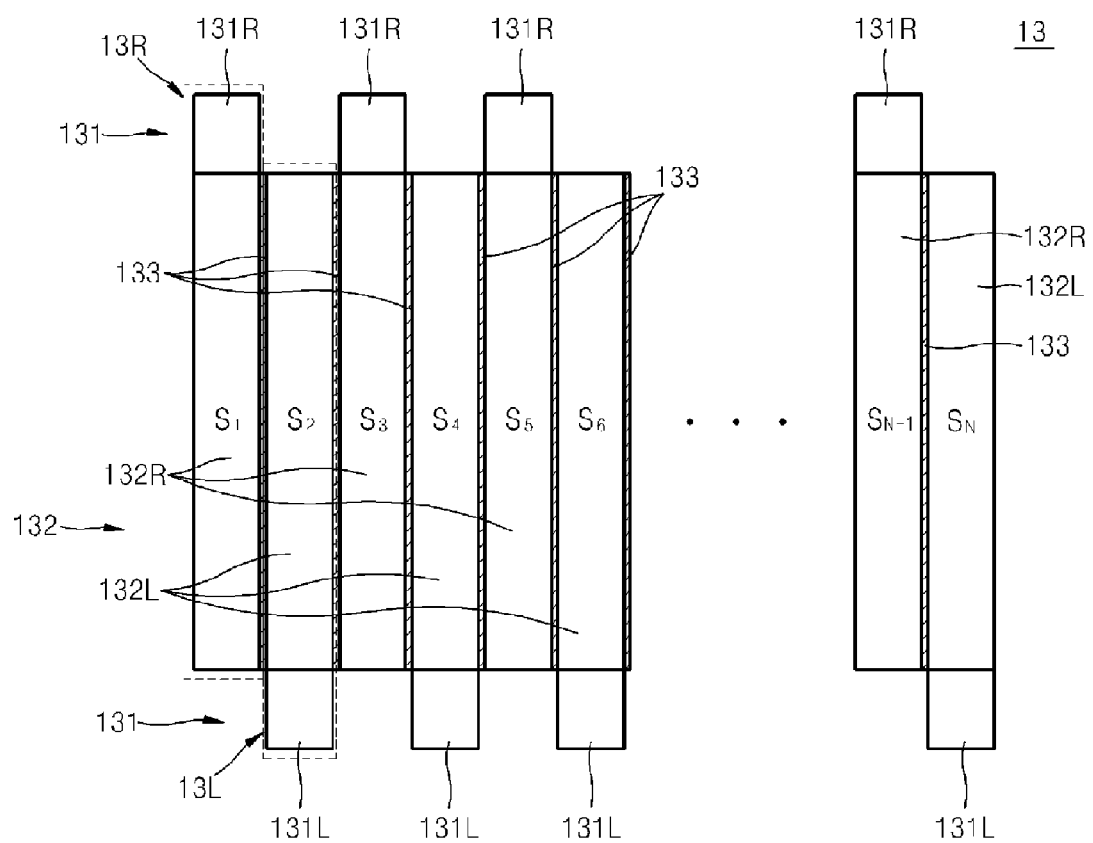

FIGS. 7 and 8 are an exploded perspective view and a plan view, respectively, of a backlight unit 13. Referring to FIGS. 7 and 8, the backlight unit 13 includes a plurality of point light sources 131 which provide light, and a plurality of light guide segments 132 which form a light guide panel for guiding the light emitted from the point light sources 131. The backlight unit 13 has an edge emitting type structure in which the point light sources 131 are arranged at the lateral sides of the light guide segments 132.

Each of the point light sources 131 can be a light emitting device, such as a light emitting diode (LED). The backlight unit 13 is used in the 2D/3D switchable image display devices 10 of FIG. 2 employing the image panel 19 of FIG. 2 and having the color filter 194 of FIG. 5. However, the backlight unit 13 preferably provides a white light. Thus, the point light sources 131 can each be a white light source which emits a white light.

Each of the light guide segments 132 is a bar-type light guide member having a plurality of light exit surfaces $S_1$, $S_2, ..., S_N$ in the shape of strips. The body of each of the light guide segments 132 is formed of a transparent material capable of transmitting an incident light, such as polymethylmethacrylate (PMMA), which is a plastic material that has superior light transmissivity and weather-resistant characteristics. The light exit surfaces $S_1, S_2, ..., S_N$ are parallel to one another on the same plane, such that the light guide segments 132 are arranged to form the light guide panel.

The point light sources 131 include a plurality of point light sources 131L for a left eye vision range and a plurality of point light sources 131R for a right eye vision range. The light guide segments 132 include a plurality of light guide segments 132L for a left eye vision range which receive the light from the point light sources 131L for a left eye vision range, and a plurality of light guide segments 132R for a right eye vision range which receive the light from the point light sources 131R for a right eye vision range. The point light sources 13 IL for a left eye vision range and the light guide segments 132L for a left eye vision range form the segment light sources 13L for a left eye vision range, and the point light sources 131R for a right eye vision range and the light guide segments 132R for a right eye vision range form the segment light sources 13R for a right eye vision range. The light guide segments 132L for a left eye vision range and the light guide segments 132R for a right eye vision range are alternately arranged.

A light shield film 133 can be provided between the light guide segments 132L for a left eye vision range and the light guide segments 132R for a right eye vision range. The light shield film 133 prevents the light $L_L$ for a left eye vision range guided by the light guide segments 132L for a left eye vision range and the light $L_R$ for a right eye vision range guided by the light guide segments 132R for a right eye vision range from being mixed with each other. The light shield film 133 is formed of an opaque material that does not transmit light, and can also be a reflection film that reflects light or a light absorbing film that absorbs light.

Each of the point light sources 131L for a left eye vision range is arranged at an end portion of one of the sides of one of the light guide segments 132L for a left eye vision range, and each of the light guide segments 132R for a right eye vision range is arranged at an end portion of one of the sides of one of the light guide segments 132R for a right eye vision range. The end portion of one of the sides of one of the light guide segments 132R for a right eye vision range is on the opposite side of the end portion of one of the sides of one of the light guide segments 132L for a left eye vision range. This is because the uniformity of the backlight unit 13 improves by providing the light $L_L$ for a left eye vision range and the light $L_R$ for a right eye vision range from opposite sides of the light guide segments 132 that form the light guide panel.

Figure 9:
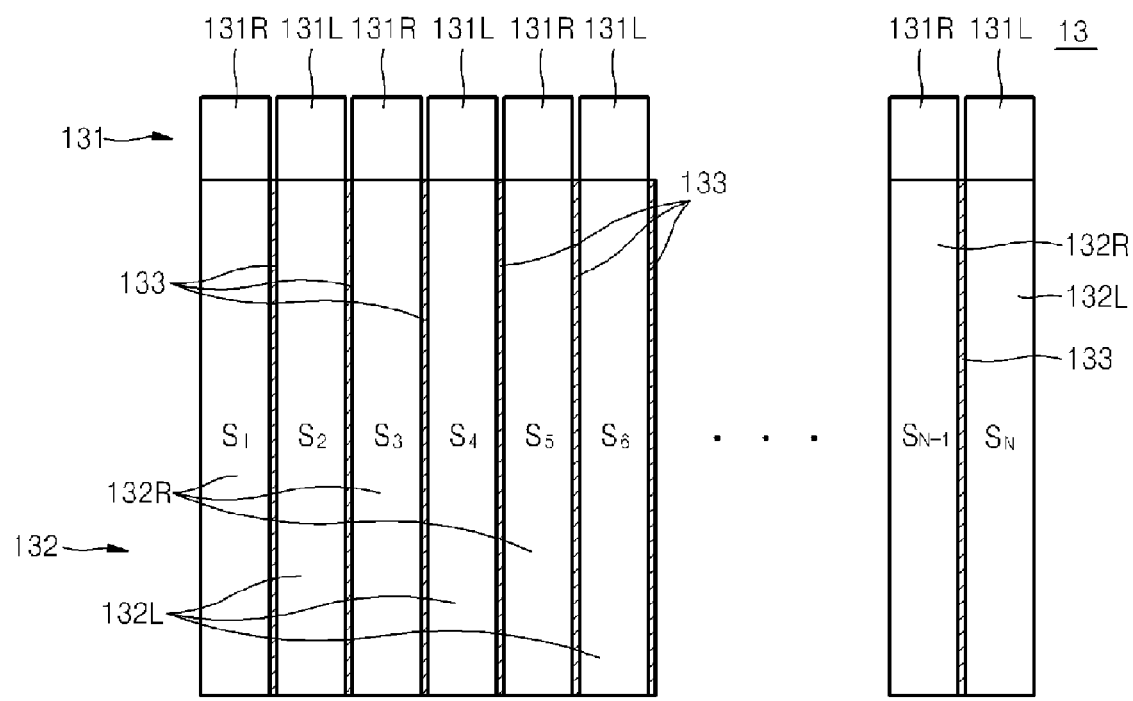
FIGS. 9 through 11 illustrate various modified examples of a backlight unit employed in the 2D/3D switchable image display device of FIG. 2.
Figure 10:
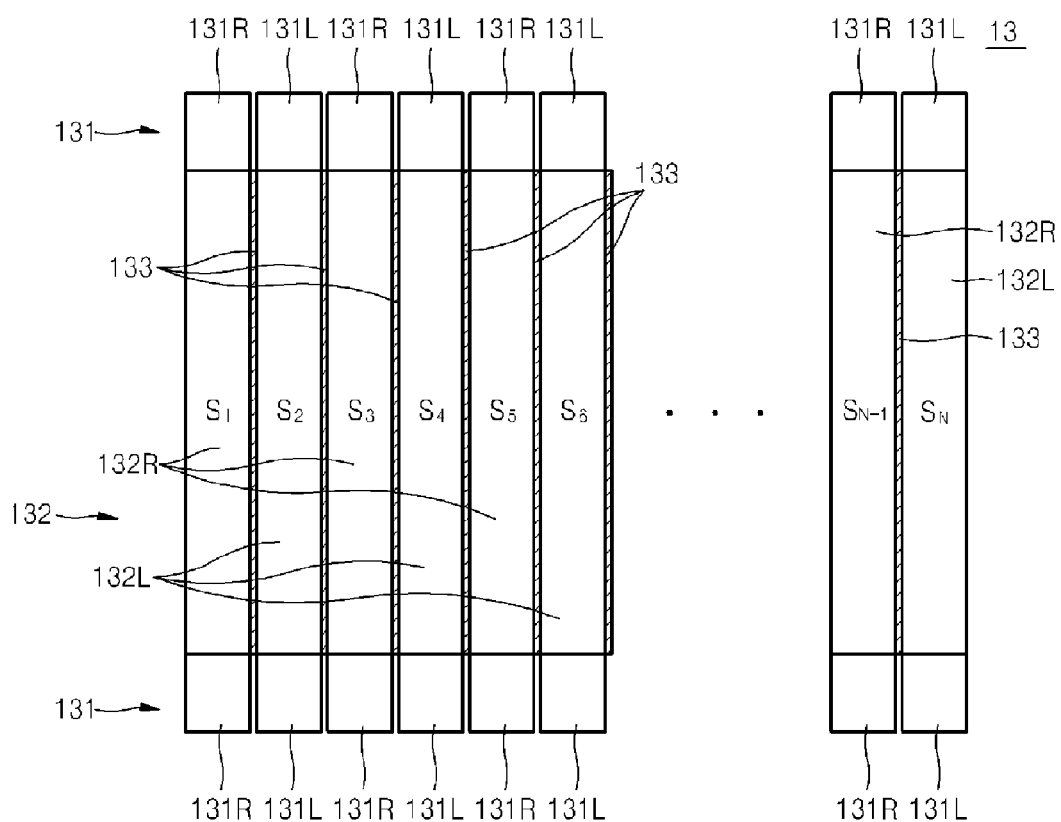

FIGS. 9 and 10 illustrate modified examples of a backlight unit employed in the 2D/3D switchable image display device of FIG. 2.

Referring to FIG. 9, the end portion of each of the light guide segments 132L for a left eye vision range and the end portion of each of the light guide segments 132R for a right eye vision range where the point light sources 131 are arranged are located at the same side. Furthermore, referring to FIG. 10, one of the point light sources 131L for a left eye vision range can be arranged at each end portion of one of the light guide segments 132L for a left eye vision range, and one of the point light sources 131R for a right eye vision range can be arranged at each end portion of one of the light guide segments 132R for a right eye vision.

Figure 11:
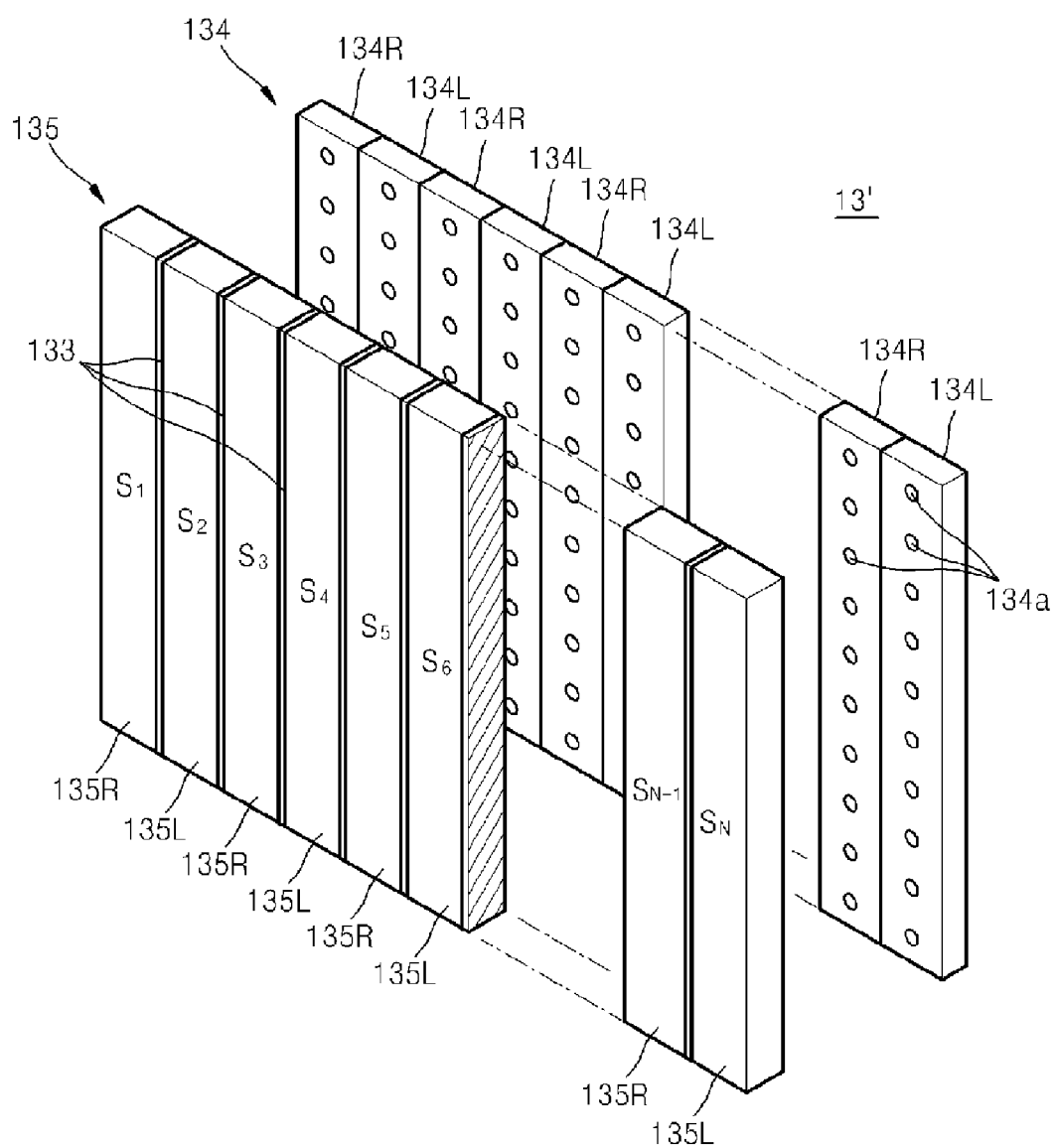

FIG. 11 illustrates another modified example of a backlight unit employed in the 2D/3D switchable image display device of FIG. 2.

Referring to FIG. 11, the backlight unit 13' includes a plurality of light sources 134 which provide light, and a plurality of optical sheets 135 which make the light emitted from the light sources 134 uniform. The backlight unit 13' has a direct-type structure in which the light sources 134 are arranged on the rear surface of the optical sheets 135. Since the backlight unit 13' of the present modified example is substantially the same as the backlight unit 13 described with reference to FIG. 7 except for the direct-type structure, a description thereof will be omitted herein.

The light sources 134 emit a surface light and are formed in a stripe shape. The light sources 134 can have a structure in which a plurality of point light sources 134a are arranged in a row, as shown in FIG. 11. However, the light sources 134 are not limited thereto, and thus a linear light source, such as a cold cathode fluorescent lamp (CCFL), can be installed in the lengthwise direction in the form of the stripe, or a variety of light sources capable of emitting a surface light having a stripe shape can be employed. The optical sheets 135 are formed to improve the characteristic of the light emitted from the light sources 134, and can include a diffusion sheet for making the light uniform. The light sources 134 include a plurality of light sources 134L for a left eye vision range and a plurality of light sources 134L for a left eye vision range. The optical sheets 135 include a plurality of optical sheets 135L for a left eye vision range corresponding to the light sources 134L for a left eye vision range, and a plurality of optical sheets 135R for a right eye vision range corresponding to the light sources 134R for a right eye vision range The light sources 134L for a left eye vision range and the light sources 134R for a right eye vision range are alternately arranged. The light shield film 133 can be provided between the optical sheets 135L for a left eye vision range and the optical sheets 135R for a right eye vision range. This prevents the light $L_L$ for a left eye vision range passing through the optical sheets 135L for a left eye vision range and the light $L_R$ for a right eye vision range passing through the optical sheets 135R for a right eye vision range from being mixed with each other.

The operation of the 2D/3D switchable image display device 10 according to the present exemplary embodiment will be described below. First, the process of displaying a 3D image is described.

Figure 12:
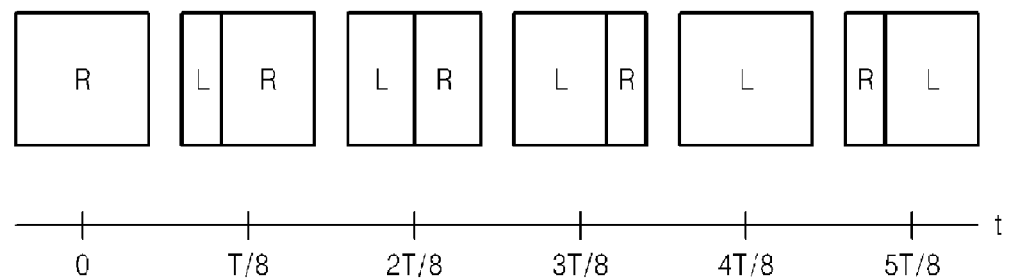
FIG. 12 illustrates the process of sequentially scanning an image for a left eye vision range and an image for a right eye vision range on an image panel.

Referring to FIGS. 2 and 3, the image panel 19 alternately displays a left image and a right image. As described above, the image panel 19 displays an image by the vertical line, and scans the image in the horizontal direction to display the left image and the right image in two dimensions. Referring to FIG. 12, for example, when the image panel 19 of FIG. 2 displays a right image R starting from a time of 0 seconds after the time of T/8 has passed, a left image L is displayed in ¼ of the area of the image panel 19, and the remaining ¾ of the area of the image panel 19 displays the right image R. The period T denotes a frame of a 3D image, that is, the total time during which a frame of the left image L and a frame of the right image R are scanned. When the time of T/8 passes again, ½ of the area of the image panel 19 displays the left image L, and the remaining ½ of the area of the image panel 19 displays the right image R. As the scanning continues, when t=T/2, the image panel 19 displays the left image L only. When another time of T/2 passes, only the right image R is displayed.

The backlight unit 13 alternately emits the light $L_L$ for a left eye vision range and the light $L_R$ for a right eye vision range in synchronism with the left image L and the right image R displayed on the image panel 19. For example, as shown in FIG. 3, the light $L_L$ for a left eye vision range emitted from the segment light source 13L for a left eye vision range located at the left among a pair of the segment light sources 13L and 13R passes through the lenticular lens sheet 17 and proceeds toward the left eye vision range $O_L$ of a viewer. The light $L_R$ for a right eye vision range emitted from the segment light source 13R for a right eye vision range located at the right among the pair of the segment light sources 13L and 13R passes through the lenticular lens sheet 17 and proceeds toward the right eye vision range $O_R$ of the viewer. Although in FIG. 3 only one left eye vision range $O_L$ and one right eye vision range $O_R$ are illustrated, the light emitted from each of the segment light sources 13L and 13R passes through the other semi-cylindrical lenses 17a of the lenticular lens sheet 17 and forms a plurality of left eye vision ranges and a plurality of right eye vision ranges that are not shown.

Figure 13A:
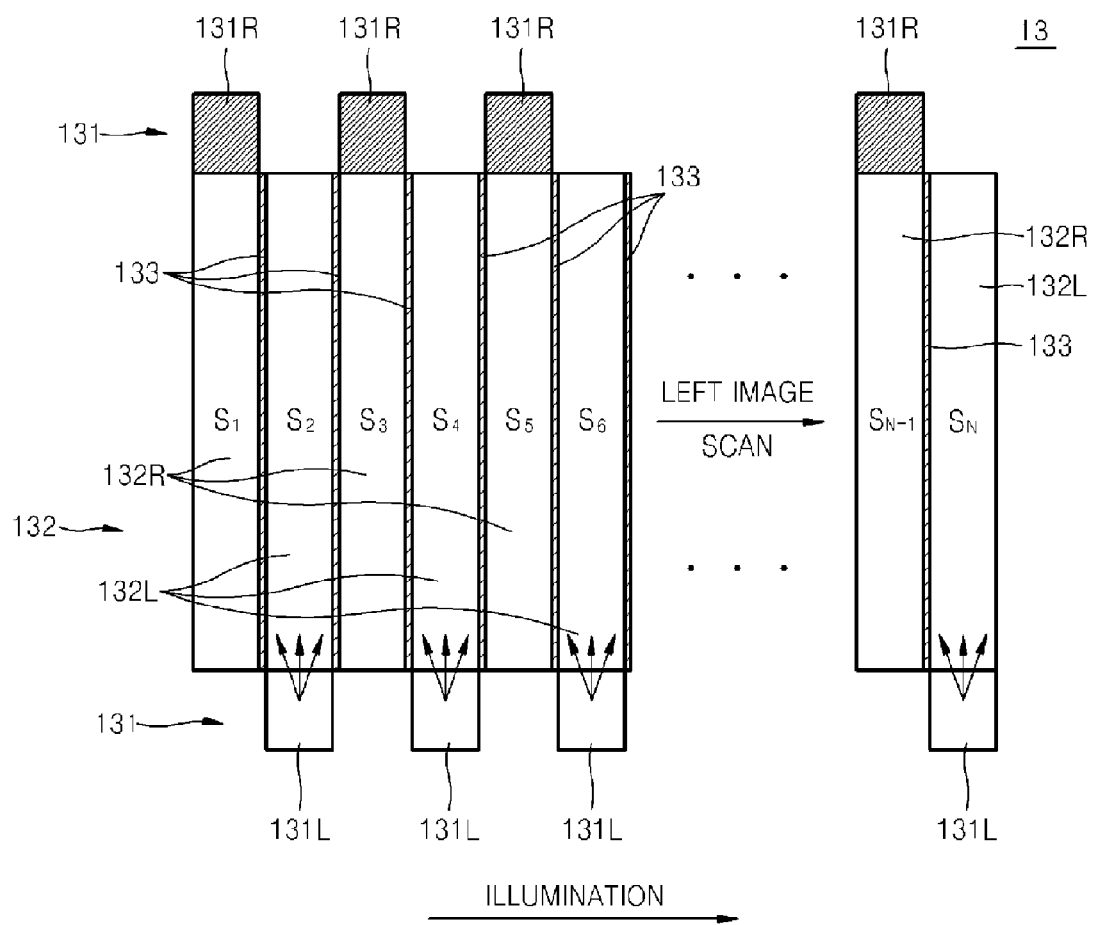
FIGS. 13A and 13B illustrate the operation of sequentially driving a segment light source for a left eye vision range and a segment light source for a right eye vision range when the image for a left eye vision range and the image for a right eye vision range are sequentially scanned on the image panel.
Figure 13B:
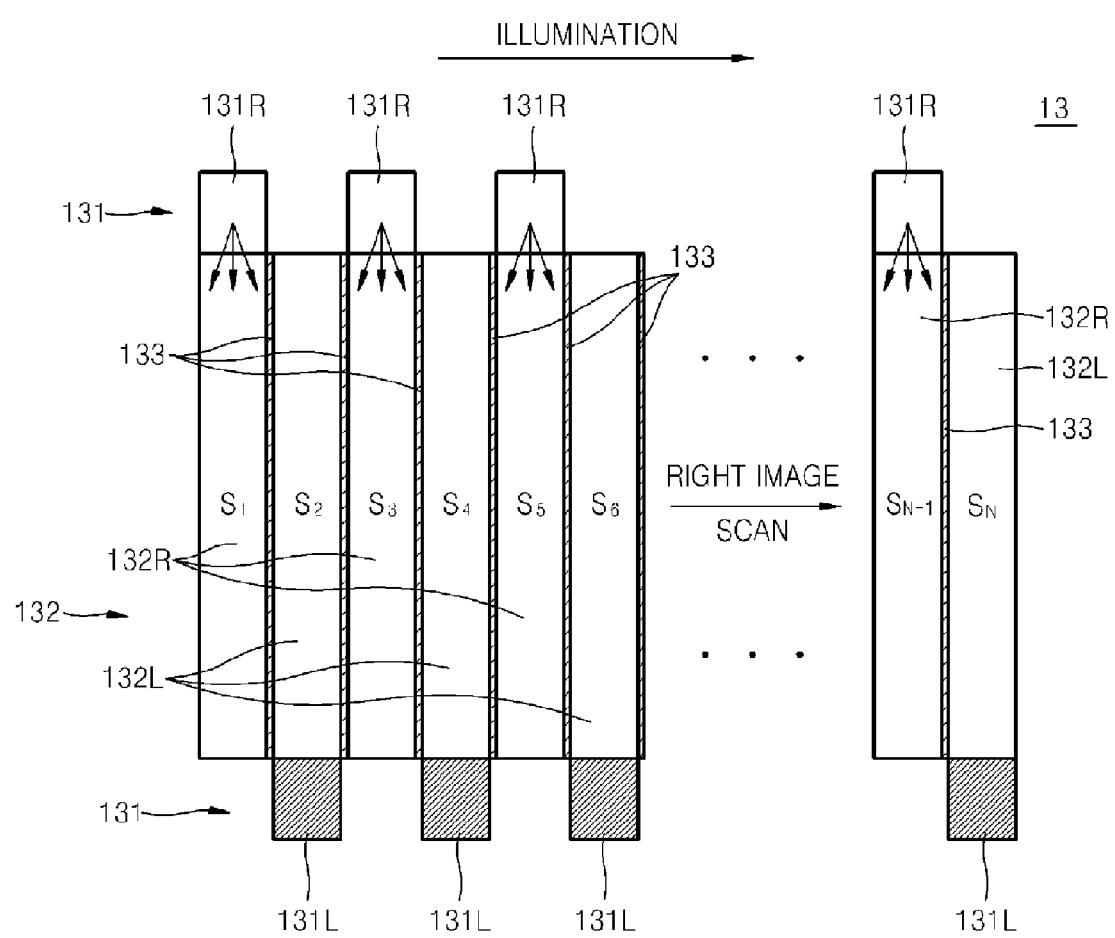

As described above, since the left and right images L and R are scanned in the horizontal direction and displayed on the image panel 19, the segment light sources 13L and 13R of the backlight unit 13 are sequentially driven in synchronism with a scan signal of an image displayed on the image panel 19. FIGS. 13A and 13B illustrate the sequential operation of the backlight unit 13.

Referring to FIG. 13A, when the left image L of FIG. 12 is input to the image panel 19 for each vertical line and scanned in the horizontal direction, the point light source 131L for a left eye vision range corresponding to the vertical line for which the input is complete is turned on. The light emitted from the point light source 131L for a left eye vision range illuminates the vertical line for which the input to the image panel 19 is complete through the light guide segment 132L for a left eye vision range.

Referring to FIG. 13B, when the right image R of FIG. 12 is input to the image panel 19 for each vertical line and scanned in the horizontal direction, the point light source 131R for a right eye vision range corresponding to the vertical line for which the input is complete is turned on. The light emitted from the point light source 131R for a right eye vision range illuminates the vertical line for which the input to the image panel 19 is complete through the light guide segment 132R for a right eye vision range.

Thus, as the backlight unit 13 is sequentially driven in synchronism with the scan signal of an image displayed on the image panel 19, the light providing time is increased, so that a frame rate or brightness can be increased.

Figure 14:
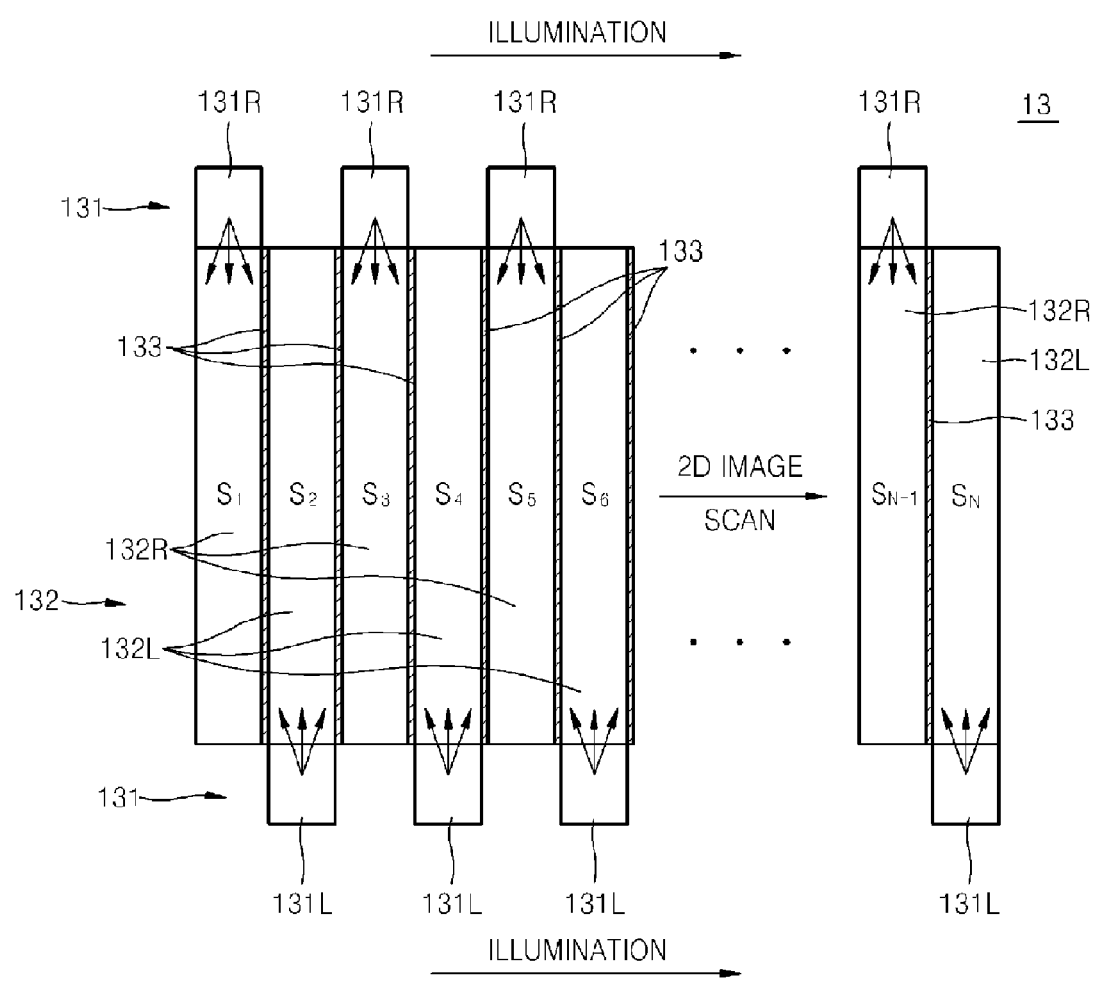
FIG. 14 illustrates that both of the segment light source for a left eye vision range and the segment light source for a right eye vision range are sequentially driven when a 2D image is scanned on the image panel.

Then, in the process of displaying a 2D image, a related art 2D image is input to the image panel 19 for each vertical line and scanned in the horizontal direction. Both of the segment light sources 13L and 13R for left and right eye vision ranges of the backlight unit 13 are sequentially driven in synchronism with a scan signal of the 2D image input to the image panel 19. For example, as shown in FIG. 14, when the 2D image is input to the image panel 19 for each vertical line and scanned in the horizontal direction, the point light source 131L for a left eye vision range or point light source 131R for a right eye vision range which corresponds to the vertical line for which the input is complete is turned on. The light emitted from the point light source 131L for a left eye vision range or the point light source 131R for a right eye vision range illuminates the vertical line for which the input to the image panel 19 is complete through the light guide segment 132L for a left eye vision range or the light guide segment 132R for a right eye vision range.

Figure 15:
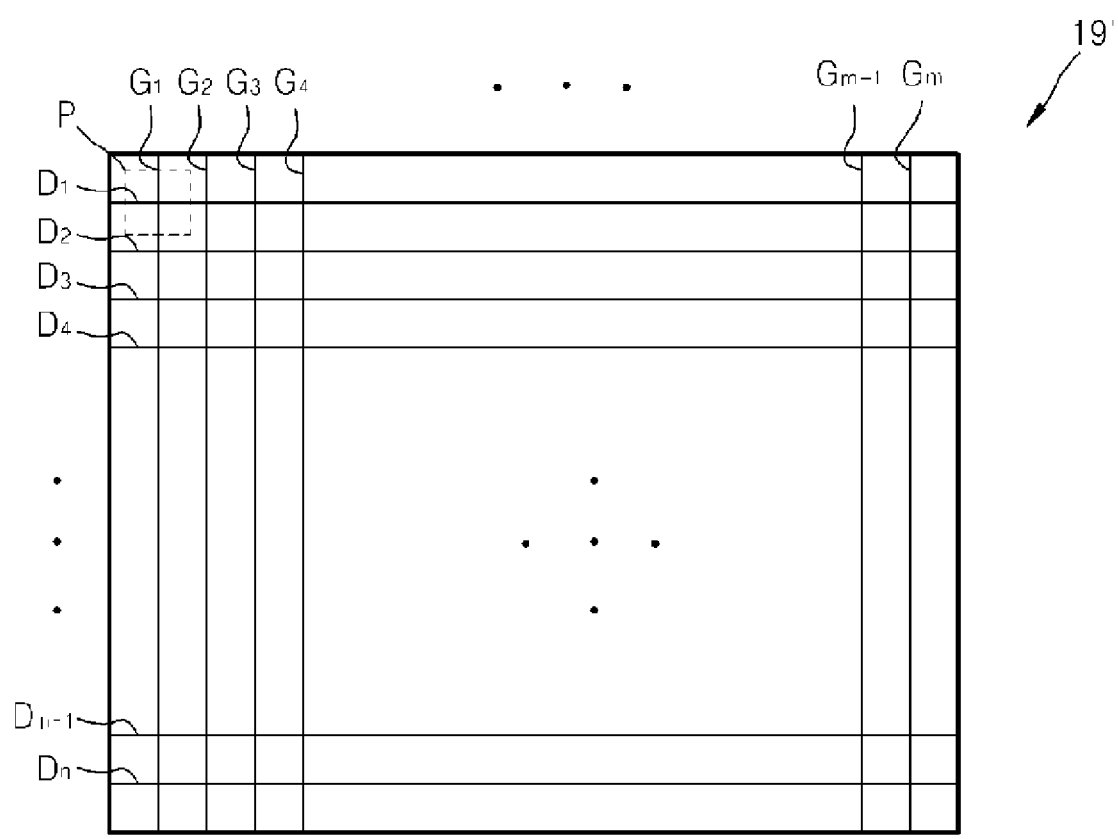
FIG. 15 illustrates an image panel employed in a 2D/3D switchable image display device according to another exemplary embodiment of the present invention.
Figure 16:
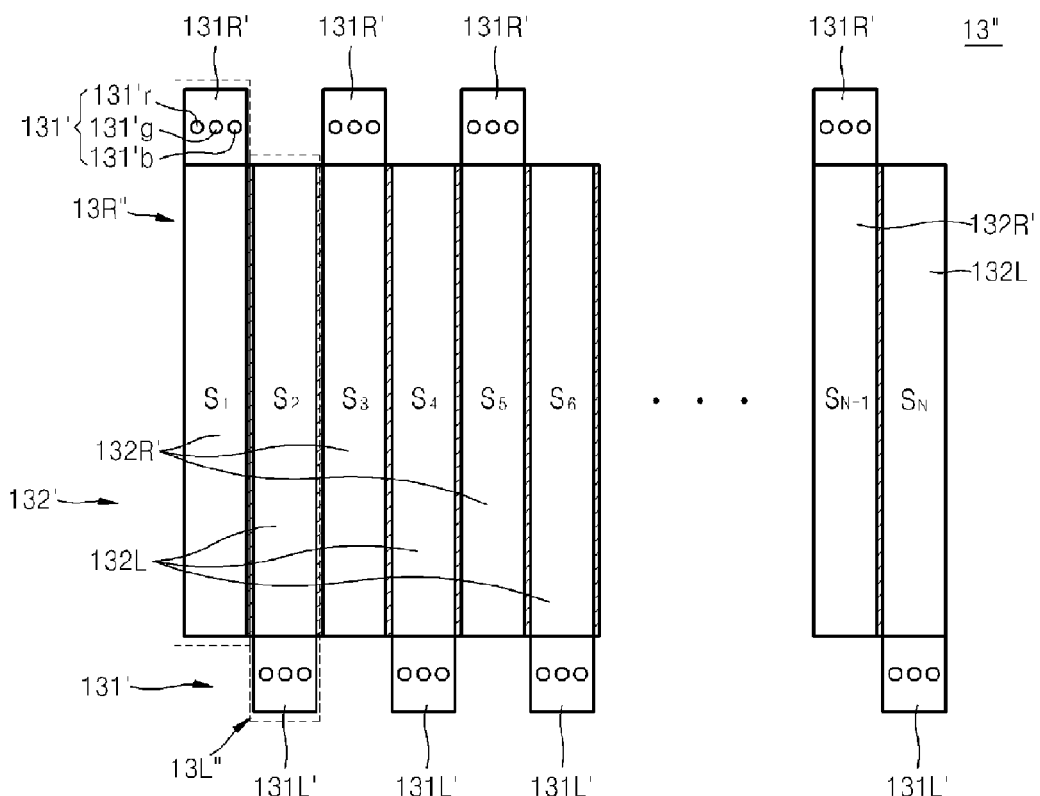
FIG. 16 illustrates a backlight unit employed in the 2D/3D switchable image display device of FIG. 15.

FIG. 15 illustrates an image panel 19' employed in a 2D/3D switchable image display device according to another exemplary embodiment of the present invention. FIG. 16 illustrates a backlight unit 13" employed in the 2D/3D switchable image display device of FIG. 15. The 2D/3D switchable image display device according to the present exemplary embodiment is substantially the same as the 2D/3D switchable image display device 10, except that the image panel 19' does not have the color filter 194, and the structure of a light source of the backlight unit 13" is different. Accordingly, to avoid a repeated description, the following description focuses on the differences.

A liquid crystal panel without the color filter 194 can be employed as the image panel 19' of the present exemplary embodiment, and such liquid crystal panel is substantially the same as the image panel 19 of FIG. 5, except for not having the color filter 194. Thus, since the color filter 194 is not included, a unit pixel is made of a cross point of one of the data lines $D_1, D_2, \ldots, D_N$ and one of the gate lines $G_1, G_2, \ldots, G_N$.

The backlight unit 13" as shown in FIG. 16 includes a plurality of point light sources 131' which provide light and a plurality of light guide segments 132' which form a light guide panel for guiding the light emitted from the point light sources 131'. The point light source 131' includes a plurality of point light sources 131L' for a left eye vision range and a plurality of point light sources 131R' for a right eye vision range. The light guide segments 132' include a plurality of light guide segments 132L' for a left eye vision range which receive the light from the point light sources 131L' for a left eye vision range, and a plurality of light guide segments 132R' for a right eye vision range which receive the light from the point light sources 131R' for a right eye vision range. The point light sources 131L' for a left eye vision range and the light guide segments 132L' for a left eye vision range make a plurality of segment light sources 13L" for a left eye vision range, and the point light sources 131R' for a right eye vision range and the light guide segments 132R' for a right eye vision range make a plurality of segment light sources 13R" for a right eye vision range. Each of the point light sources 131L' for a left eye vision range and the point light sources 131R' for a right eye vision range includes a plurality of monochrome light sources corresponding to a monochrome field displayed on the image panel 19'. Since an image frame is split into a red field, a green field, and a blue field, each of the point light sources 131' includes a red light source 131'r, a green light source 131'g, and a blue light source 131'b. A color image is presented by dividing an image frame into a plurality of monochrome fields and illuminating monochrome light corresponding to each monochrome field. The other constituent elements of the backlight unit 13" are substantially the same as those of the backlight unit 13 described with reference to FIGS. 7 and 8.

The structure of the backlight unit 13" employed in the present exemplary embodiment is not limited to the structure shown in FIG. 16, and the other structures except for the light source portion can have the structure of the backlight unit shown in FIGS. 9 through 11.

The operation of the 2D/3D switchable image display device according to the present exemplary embodiment will be described below. First, the process of displaying a 3D image is described.

A 3D image is split by an image signal processing portion (not shown) into an R1 field, a G1 field, and a B1 field of a left image, and an R2 field, a G2 field, and a B2 field of a left image. The R1 and R2 fields indicate a red field, the G1 and G2 fields indicate a green field, and the B1 and B2 fields indicate a blue field. The R1, G1, B1, R2, G2, and B2 fields can be displayed on the image panel 19' of FIG. 15 in a variety of orders. For example, a 3D image can be displayed in the order of the R1 field, the R2 field, the G1 field, the G2 field, the B1 field, and the B2 field as shown in FIG. 17A, or in the order of the R1 field, the G1 field, the B1 field, the R2 field, the G2 field, and the B2 field as shown in FIG. 17B.

Figure 17A:
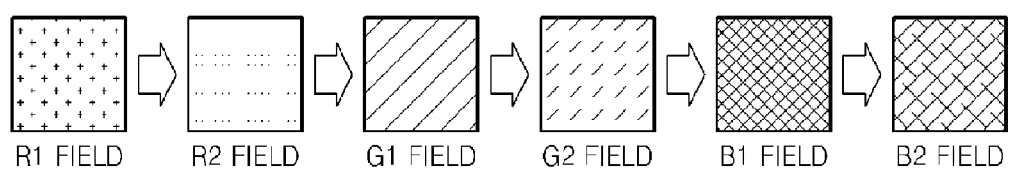
FIGS. 17A and 17B illustrate the order of scanning left and right image monochrome fields when each of a plurality of 3D image frames is split into a left image monochrome field and a right image monochrome field.
Figure 17B:
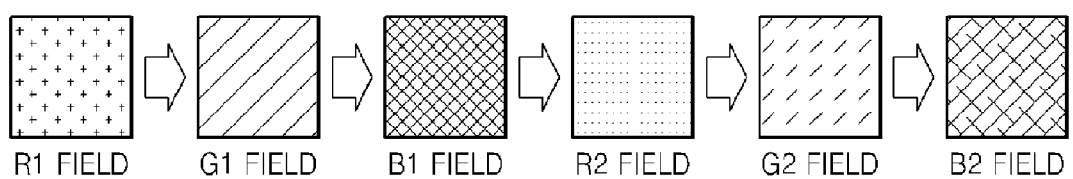
Figure 18:
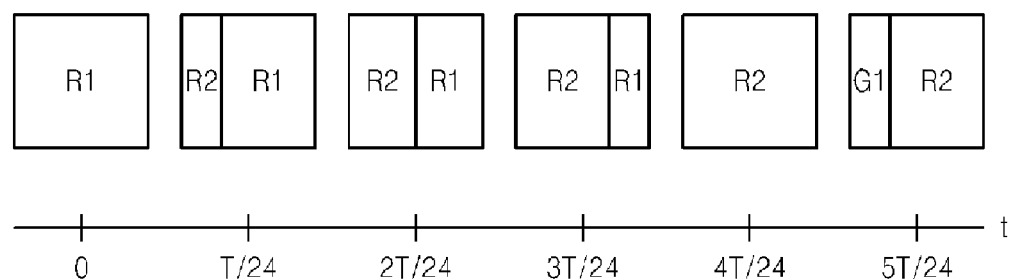
FIG. 18 illustrates the process of sequentially scanning the left and right image monochrome fields in the image panel.

FIG. 18 illustrates the scanning pattern when the monochrome fields are input to the image panel 19' in the order illustrated in FIG. 17A. For example, when the image panel 19' displays the R1 field starting from a time of 0 seconds, after a time of T/24 has passed, the R2 field is newly displayed in ¼ of the area of the image panel 19', and the remaining ¾ of the area of the image panel 19' displays the R1 field. When a time of T/24 passes again, ½ of the area of the image panel 19' displays the R2 field, and the remaining ½ of the area of the image panel 19' displays the R1 field. As the scanning continues, when t=T/6, the image panel 19' displays the R2 field only. When another time of T/24 passes, the G1 field is newly displayed in ¼ of the area of the image panel 19', and the remaining ¾ of the area of the image panel 19' displays the R2 field. Thus, the respective monochrome fields are sequentially displayed on the image panel 19'. The period T denotes a frame of a 3D image, that is, the total time during which 3 monochrome fields of the left image L and 3 monochrome fields of the right image R are scanned.

Figure 19A:
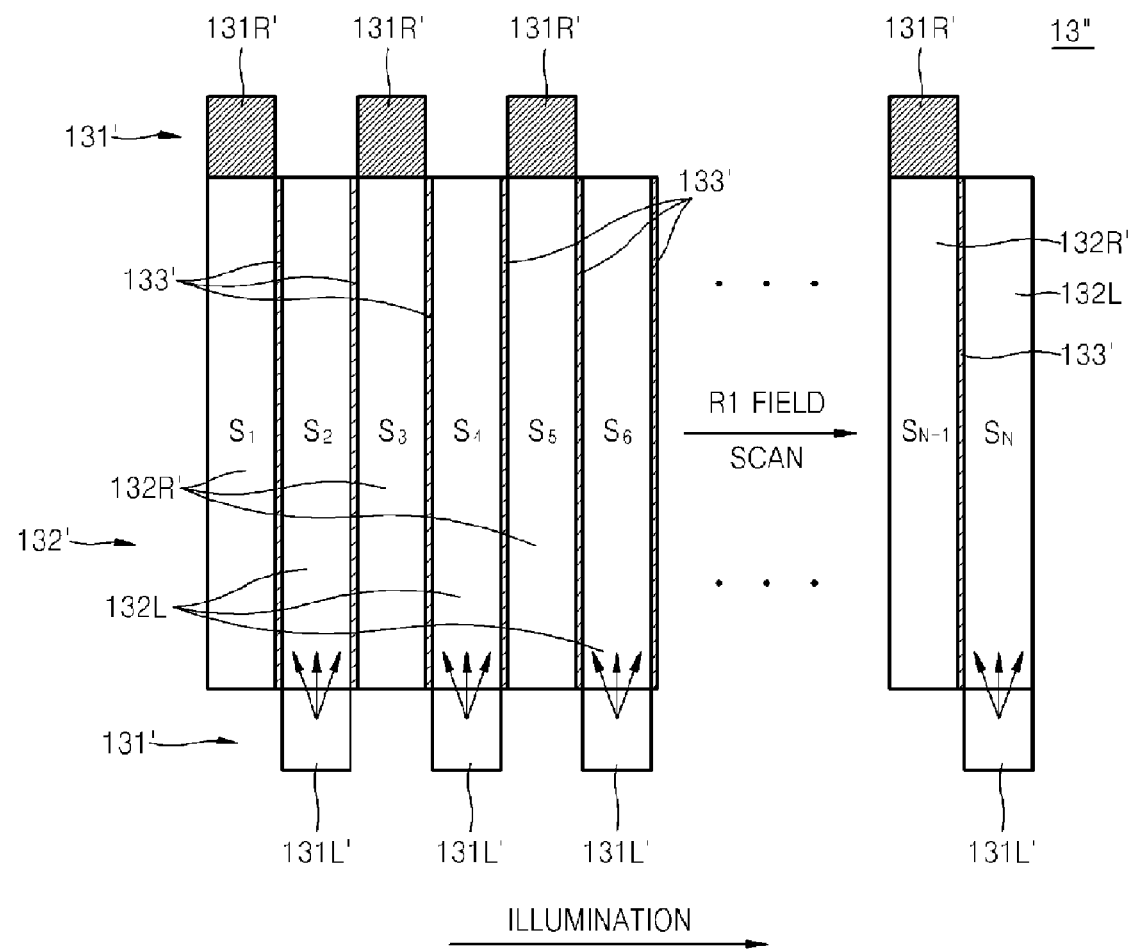
FIGS. 19A and 19B illustrate the operation of sequentially driving a segment light source for a left eye vision range and a segment light source for a right eye vision range when the monochrome fields for a left eye vision range and the monochrome fields for a right eye vision range are sequentially scanned on the image panel.
Figure 19B:
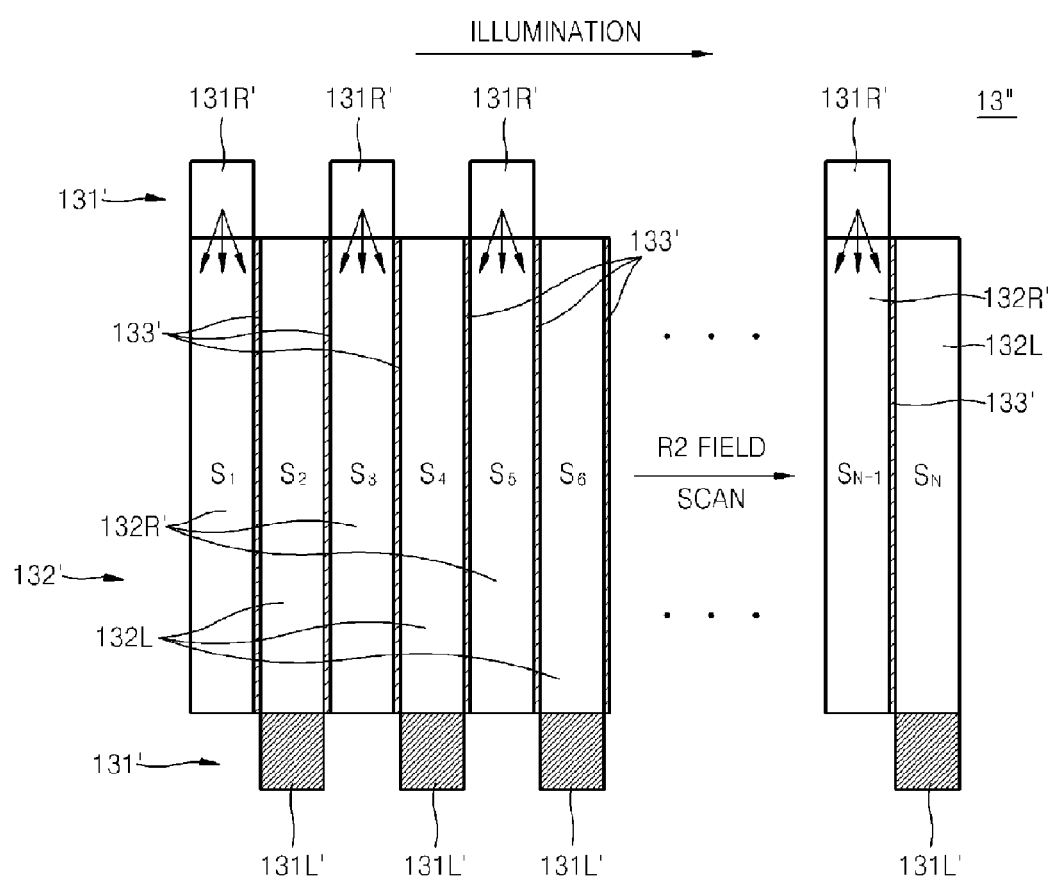

The backlight unit 13" alternately emits the monochrome lights for a left eye vision range and the monochrome lights for a right eye vision range in synchronism with the monochrome fields displayed on the image panel 19'. For example, as shown in FIG. 19A, when the R1 field is input to each vertical line of the image panel 19' and scanned in the horizontal direction, a red light source of the point light sources 131L' for a left eye vision range corresponding to the vertical line for which the input is complete is turned on. The emitted red light illuminates the area of the vertical line for which the input to the image panel 19' is complete through the light guide segment 132L' for a left eye vision range. Also, as shown in FIG. 19B, when the R2 field is input to each vertical line of the image panel 19' and scanned in the horizontal direction, a red light source of the point light sources 131R' for a right eye vision range corresponding to the vertical line for which the input is complete is turned on. The emitted red light illuminates the area of the vertical line for which the input to the image panel 19' is complete through the light guide segment 132R' for a right eye vision range. Thus, as the respective monochrome lights are sequentially emitted in synchronism with the monochrome fields of the left and right images, a 3D color image can be displayed.

Figure 20:
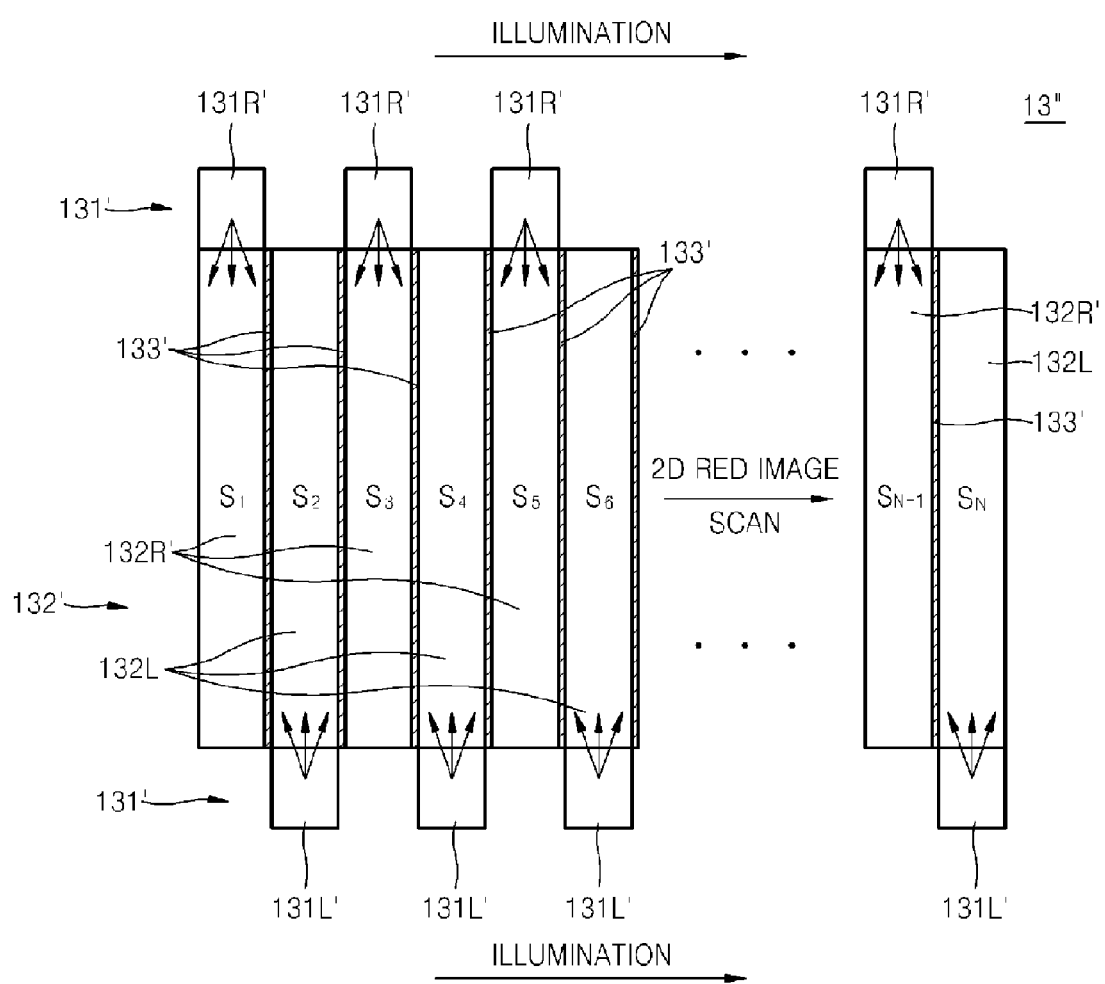
FIG. 20 illustrates the operation of sequentially driving both of the segment light source for a left eye vision range and the segment light source for a right eye vision range when a 2D monochrome field is scanned on the image panel.

Then, in the process of displaying a 2D image, a 2D image is split by the image signal processing portion into a plurality of monochrome fields. For example, a 2D image can be split into a red field, a green field, and a blue field. The respective monochrome fields of the 2D image are input to each vertical line of the image panel 19' and scanned in the horizontal direction. In the backlight unit 13", the segment light sources for left and right eye vision ranges are sequentially driven for each monochrome light source in synchronism with a scan signal of each monochrome filed input to the image panel 19'. For example, as shown in FIG. 20, when each monochrome field of the 2D image is input to each vertical line of the image panel 19' and scanned in the horizontal direction, the point light source 131L' for a left eye vision range or the point light source 131R' for a right eye vision range corresponding to the vertical line for which the input is complete and which is turned on. The emitted light illuminates the area of the vertical line for which the input to the image panel 19' is complete through the light guide segment 132L' for a left eye vision range or the light guide segment 132R' for a right eye vision range.

In the above-described exemplary embodiments, the backlight units are sequentially driven for each segment light source in synchronism with the scan signal of the image panel. However, the present invention is not limited to the sequential driving method, and can display a 2D or 3D image in various other methods. For example, a simultaneous driving method can be employed in which a light is emitted after a frame of an image is completely displayed on the image panel 19, and then the next image frame is updated.

As described above, the backlight unit according to exemplary embodiments of the present invention and the 2D/3D switchable image display device are effective as follows.

First, since the structure for providing the lights for left and right eye vision ranges to the lenticular lens sheet is embodied by only the backlight unit, the structure of the device can be simplified. In particular, by removing an optical switch used in the related art 3D image display device to control the lights for left and right eye vision ranges, the light use efficiency is improved, and the number of optical parts are decreased, so that the manufacturing cost can be reduced.

Second, by making the scanning direction of the image panel the horizontal direction, the backlight unit can be sequentially driven in the scanning direction of an image that is displayed. In the sequential driving, since the light providing time is increased, the frame rate or brightness can be increased.

Third, since the lights for left and right eye vision ranges are emitted from the rear surface of the image panel, all pixels of the image panel can be used in displaying each of the left and right images of the 3D image.

While this invention has been particularly shown and described with reference to exemplary embodiments thereof, it will be understood by those skilled in the art that various changes in form and details may be made therein without departing from the spirit and scope of the invention as defined by the appended claims and their legal equivalents.

What is claimed is:

1. A backlight unit employed in a 2D/3D switchable image display device, the backlight unit comprising:
   a plurality of segment light sources for a left eye vision range which emit a light for a left eye vision range, and a corresponding plurality of optical sheets for the left eye vision range; and
   a plurality of segment light sources for a right eye vision range which emit a light for a right eye vision range, and a corresponding plurality of optical sheets for the right eye vision range; and
   light shield film which is arranged between each of the plurality of optical sheets for the left eye vision range and a respective one of the plurality of optical sheets for the right eye vision range, such that light passing through the plurality of optical sheets for the left eye vision range is prevented from mixing with light passing through the plurality of optical sheets for the right eye vision range,
   wherein the segment light sources for the left eye vision range and the segment light sources for the right eye vision range are alternately arranged to form a surface light source; and
   wherein in a 3D mode, the segment light sources for the left eye vision range are driven in synchronism with an image for the left eye vision range, and the segment light sources for the right eye vision range are driven in synchronism with an image for the right eye vision range; and
   wherein in a 2D mode, the segment light sources for the left eye vision range and the segment light sources for the right eye vision range are driven in synchronism with a 2D image.

2. The backlight unit of claim 1, wherein:
   each of the segment light sources for the left eye vision range comprises a light guide segment for the left eye vision range comprising a light exit surface with a stripe shape, and a point light source for the left eye vision range which provides light to the light guide segment for the left eye vision range,
   each of the segment light sources for the right eye vision range comprises a light guide segment for the right eye vision range comprising a light exit surface with a stripe shape, and a point light source for the right eye vision range which provides light to the light guide segment for the right eye vision range, and the light guide segment for the left eye vision range and the light guide segment for the right eye vision range are alternately arranged to form a light guide panel.

3. The backlight unit of claim 2, wherein:
the point light source for the left eye vision range is arranged at an end portion of the light guide segment for the left eye vision range,
the point light source for the right eye vision range is arranged at an end portion of the light guide segment for the right eye vision range, and
the end portion of the light guide segment for the left eye vision range is arranged on the opposite side to the end portion of the light guide segment for the right eye vision range.

4. The backlight unit of claim 2, wherein:
the point light source for the left eye vision range is arranged at an end portion of the light guide segment for the left eye vision range,
the point light source for the right eye vision range is arranged at an end portion of the light guide segment for the right eye vision range, and
the end portion of the light guide segment for the left eye vision is arranged on the same side as the end portion of the light guide segment for the right eye vision range.

5. The backlight unit of claim 2, wherein:
the point light source for the left eye vision range is arranged at each end portion of the light guide segment for the left eye vision range, and
the point light source for the right eye vision range is arranged at each end portion of the light guide segment for the right eye vision range.

6. The backlight unit of claim 1, wherein each of the segment light sources for the left eye vision range and each of the segment light sources for the right eye vision range is a white light source.

7. The backlight unit of claim 1, wherein each of the segment light sources for the left eye vision range and each of the segment light sources for the right eye vision range comprises a red light source, a green light source, and a blue light source.

8. A 2D/3D switchable image display device comprising:
an image panel;
a backlight unit arranged at the rear side of the image panel, the backlight unit comprising:
a plurality of segment light sources for a left eye vision range which emit a light for a left eye vision range, and a corresponding plurality of optical sheets for the left eye vision range; and
a plurality of segment light sources for a right eye vision range emitting a light for a right eye vision range, and a corresponding plurality of optical sheets for the right eye vision range; and
light shield film which is arranged between each of the plurality of optical sheets for the left eye vision range and a respective one of the plurality of optical sheets for the right eye vision range, such that light passing through the plurality of optical sheets for the left eye vision range is prevented from mixing with light passing through the plurality of optical sheets for the right eye vision range,
wherein the segment light sources for the left eye vision range and the segment light sources for the right eye vision range are alternately arranged to form a surface light source; and
a lenticular lens sheet arranged between the image panel and the backlight unit,
wherein the lenticular lens sheet comprises a plurality of semi-cylindrical lenses which extend lengthwise in a vertical direction, and
the light for the left eye vision range and the light for the right eye vision range proceed toward the left eye vision range and the right eye vision range, respectively, and
wherein in a 3D mode, the image panel alternately displays an image for the left eye vision range and an image for the right eye vision range, the segment light sources for the left eye vision range are driven in synchronism with the image for the left eye vision range, and the segment light sources for the right eye vision range are driven in synchronism with the image for the right eye vision range, and
wherein in a 2D mode, the image panel displays a 2D image, and the segment light sources for the left eye vision range and the segment light sources for the right eye vision range are driven in synchronism with the 2D image.

9. The 2D/3D switchable image display device of claim 8, wherein a pair of segment light sources comprising a segment light source for the left eye vision range and a segment light source for the right eye vision range which are adjacent to each other is arranged to face at least one of the semi-cylindrical lenses.

10. The 2D/3D switchable image display device of claim 8, wherein the image panel scans a plurality of vertical lines of an image in a horizontal direction.

11. The 2D/3D switchable image display device of claim 8, wherein the image panel comprises a plurality of data lines in a horizontal direction and a plurality of gate lines in a vertical direction.

12. The 2D/3D switchable image display device of claim 8, wherein:
the segment light sources for the left eye vision range are sequentially driven in a direction in which the image for the left eye vision range is scanned, in synchronism with a scan signal of the image for the left eye vision range input to the image panel, and
the segment light sources for the right eye vision range are sequentially driven in a direction in which the image for the right eye vision range is scanned, in synchronism with a scan signal of the image for the right eye vision range input to the image panel.

13. The 2D/3D switchable image display device of claim 8, wherein the segment light sources for the left eye vision range and the segment light sources for the right eye vision range are sequentially driven in a direction in which the 2D image is scanned, in synchronism with a scan signal input to the image panel.

14. The 2D/3D switchable image display device of claim 8, wherein the image panel is a liquid crystal panel comprising a color filter.

15. The 2D/3D switchable image display device of claim 14, wherein:
the color filter comprises a plurality of red filters, a plurality of green filters, and a plurality of blue filters, and
each of the red, green, and blue filters has a stripe shape which extends lengthwise in a horizontal direction.

16. The 2D/3D switchable image display device of claim 14, wherein the segment light sources for the left eye vision range and the segment light sources for the right eye vision range are white light sources.

17. The 2D/3D switchable image display device of claim 8, wherein:
- an image frame for the left eye vision range and an image frame for the right eye vision range are split into a plurality of left image monochrome fields and a plurality of right image monochrome fields, and are displayed on the image panel,
- the segment light sources for the left eye vision range comprise a plurality of monochrome light sources which correspond to the left image monochrome fields, and
- the segment light sources for the right eye vision range comprise a plurality of monochrome light sources which correspond to the right image monochrome fields.

18. The 2D/3D switchable image display device of claim 17, wherein:
- each of the left image monochrome fields and each of the right image monochrome fields comprises red, green, and blue fields, and
- each of the monochrome light sources for the left eye vision range and each of the monochrome light sources for the right eye vision range comprises red, green, and blue light sources.

* * * * *